United States Patent [19]

Odell

[11] Patent Number: 5,231,288

[45] Date of Patent: Jul. 27, 1993

[54] AUDIBLE RADIATION MONITOR

[76] Inventor: Daniel M. C. Odell, 11 Russellwood Ct., Aiken, S.C. 29803

[21] Appl. No.: 844,330

[22] Filed: Mar. 2, 1992

[51] Int. Cl.$^5$ .............................................. G01T 1/17
[52] U.S. Cl. ................................ 250/336.1; 250/388; 340/600
[58] Field of Search ................ 250/388, 336.1, 370.06; 340/600

[56] References Cited

U.S. PATENT DOCUMENTS

| | | |
|---|---|---|
| 3,043,955 | 7/1962 | Friedland et al. |
| 3,081,433 | 3/1963 | Bosch et al. ........................ 325/364 |
| 3,230,371 | 1/1966 | Wolicki et al. |
| 3,443,097 | 5/1969 | Smith .................................. 250/388 |
| 4,197,461 | 4/1980 | Umbarger et al. .................. 250/370 |
| 4,386,340 | 5/1983 | Satoh .................................. 340/384 |

*Primary Examiner*—Carolyn E. Fields
*Attorney, Agent, or Firm*—Harold M. Dixon; William R. Moser; Richard E. Constant

[57] ABSTRACT

A method and apparatus for monitoring ionizing radiation comprising radiation detectors in electrical connection with an isotopic analyzer and a device for producing chords to which each isotope is mapped so that the device produces a unique chord for each isotope. Preferably the chords are pleasing to the ear, except for chords representing unexpected isotopes, and are louder or softer depending on the level of radioactivity produced by each isotope, and musical instrument voices may be simulated in producing the chords as an aid to distinguishing similar-sounding chords. Because of the representation by chords, information regarding the level and composition of the radiation in an area can be conveyed to workers in that area more effectively and yet without distracting them.

13 Claims, 1 Drawing Sheet

AUDIBLE RADIATION MONITOR

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention:

The present invention relates to radiation monitoring. In particular the present invention relates to a method and apparatus for informing those working in a radioactive environment of the level and composition of the radiation present.

2. Discussion of Background:

In a variety of fields, individuals work in environments where they may be exposed to radiation, either as a part of the specific tasks they perform such as in laboratories where radioisotopes are handled, or as a risk associated with their work in the event of an accident. In these environments, radiation monitoring equipment is routinely provided to inform those present of the levels of radiation.

The well-known Geiger-Muller counter produces an audible click upon detection of beta or gamma radiation entering a detection tube. The rate of clicking informs those present of the level of the radiation but not its composition. Moreover, the Geiger counter cannot detect alpha or neutron radiation because neither will penetrate the detector housing.

Frequently, radiation monitors are simply connected to a high-level alarm. When the alarm sounds, those workers present know that the level of radiation has exceeded some preselected limit and that they must respond in some prescribed way, such as by evacuating the area.

Other equipment may provide considerably more information but not in audible form. Various isotopic analyzers detect radiation at different energy levels and plot the instantaneous intensities of the radiation detected to reveal peak intensities, or resonances, at various energy levels. These resonances occur when the subatomic particles within the atomic nucleus decay from one energy state to another. Since each energy state in an isotope is unique, the difference in energy from one state to another will also be unique to that isotope and is characteristic of it. The type of radiation can be identified by comparing the measured resonances with reference information about radioisotopes.

In a complex environment, with several radioisotopes, it may be helpful—it may be essential—that more complete information about the type and amount of radiation be somehow conveyed to those present in that environment. On the other hand, conveying additional information will impose a burden on workers in radiation environments, a burden that may compete for their attention as they perform analytical work perhaps.

There is a need for a method and apparatus for providing to those working in radioactive or potentially radioactive environments the information they need about the amount and composition of the radiation in that environment.

SUMMARY OF THE INVENTION

According to its major aspects and broadly stated, the present invention is an apparatus comprising one or more radiation detectors, each of which produces an output proportional to a number of counts of radioactive particles impinging on the detector. The output is fed into an isotopic analyzer. The analyzer collects the output and displays it as a number of counts at each energy level over the energy range of the analyzer in such a way that the resonance energy levels can be seen. The analyzer output is then mapped to a device that produces a distinct, audible chord for each radioisotope detected. Ideally, the lowest resonance energy level of each isotope sets the fundamental tone or lowest frequency of the corresponding chord and any higher energy resonances are set to overtones or higher frequencies of the chord, and all preferably within an audible range of 100 to 5000 Hertz. Each chord, however, should have a pleasing sound except for any unknown or unmapped isotopes present, which, preferably, would be assigned to a dissonant chord.

The chords could be produced continuously or repeated at closely spaced intervals, rhythmically, and would increase in volume with increases in count rate. Also, each isotope could be assigned a specific musical instrument voice including the overtones normally associated with that voice.

The use of pleasing chords, heard continuously or rhythmically, to represent radiation from radioisotopes is an important feature of the present invention. Unlike other radiation monitoring systems, the listener can distinguish the radioisotopes that are present by the sound of their chords if he or she is familiar with the chord-to-isotope correspondence. Furthermore, pleasing chord sounds can be tolerated without discomfort in a work environment without being intrusive or annoying. The human ear will still hear the chords but the human mind will "tune-out" the sounds unless they change character, such as becoming dissonant or louder.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

A human being can sublimate sounds as long as the sounds are routine or normal for a particular environment and not unpleasant. If there is a change in those sounds, in volume perhaps, in frequency composition, in harmonics, the listener will become aware of the change. The sounds can be complex, yet the listener will still be sensitive to changes in them. Because of this sensitivity, sounds can be used to represent information about radiation present in a work environment that is more complex than simply the presence or absence of radiation.

Figure 1:
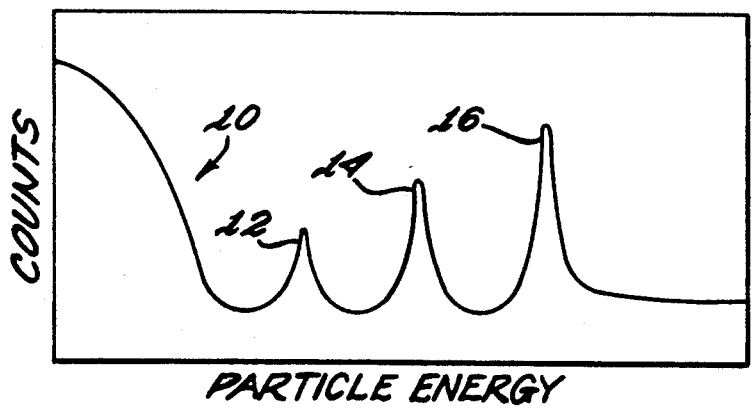
FIG. 1 is a graph showing a representative curve of count rate versus energy level for an isotope, with two energy resonances.

Referring now to FIG. 1, there is shown a graph depicting a representative trace of counts versus particle energy. Such a graph is produced by a standard isotopic analyzer based on output signals from radiation detectors. A radioisotope undergoes radioactive decay and may emit alpha particles, beta particles, gamma rays or neutrons. The particle imparts to the detector an energy that is characteristic of the radioisotope that emitted it. The number of particles counted and their energies are analyzed or determined by the isotopic analyzer.

In the trace of counts versus energy shown in FIG. 1, and indicated generally by the reference numeral 10, there will be peaks 12, 14, and 16 called resonant energies or resonances where this characteristic energy will correspond to a higher count. There may be more than one resonance, corresponding to, for example, a beta emission at one energy level and gamma rays at each of a second and a third energy level.

If the energy spectrum is superimposed on a portion of the audible frequency spectrum, preferably at the lower end such as 100 to 5000 Hertz, the resonances can be mapped to frequencies. "Mapping" means a correspondence is established, either arbitrarily or according to an algorithm, between the resonances determined by an isotopic analyzer and the chords produced by a device capable of producing audible sounds. Since each set of resonances is characteristic of a radioisotope, in effect a "finger-print", the set of frequencies to which the resonances are mapped would also be characteristic of the radioisotope.

Figure 2:
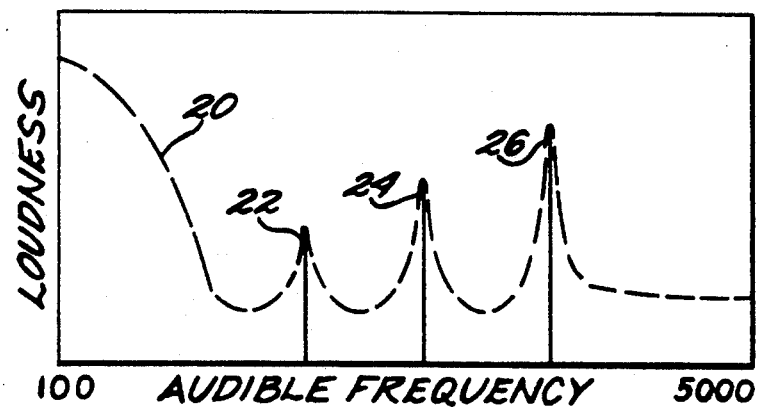
FIG. 2 shows the graph of figure one overlaying the preferred audible range with the frequencies of the chord indicated.

Compare FIGS. 1 and 2. Trace 10 is reproduced as a trace on a scale of loudness versus frequency ranging from 100 to 5000 Hertz and the frequencies equivalent to peaks 12, 14, and 16 identified as 22, 24, and 26.

It is preferable to make the combination of frequencies, or chord, a pleasing sound. The combination may be naturally pleasing or, with the addition of harmonics or overtones, may be made pleasing. Alternatively, the fundamental frequency, corresponding to the lowest resonance energy, may be augmented with overtones without regard to the particular energy or even the existence of higher resonances.

Figure 3:
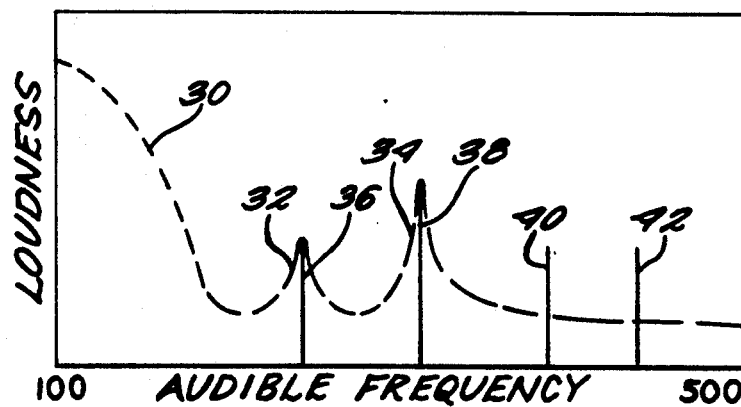
FIG. 3 shows a graph of count rate versus energy for a different radioisotope with additional overtones supplied.

FIG. 3 illustrates a trace 30 having two resonances 32 and 34. Each resonance has a frequency 36 and 38 identified but two additional frequencies 40 and 42 are added to produce a pleasing sound.

The apparatus preferably also comprises a clock for marking intervals of time. The clock can enable the device that produces the chords to generate them continuously or rhythmically as long as a count, or some minimum number of counts, has been received in an interval. Statistically insignificant variations in the count rate will not then produce an difference in the sound of the chord being produced. If the count rate increases, the chord producing device simply increases the volume.

If radiation from a source having resonances not mapped to chords is detected, a preselected, dissonant chord can be produced, thereby alerting those present that there is an additional source of radiation that is unexpected. The circumstances will then dictate the response. For example, if the apparatus is monitoring radiation in a laboratory where a procedure involving a newly received isotope is being conducted, the presence of a dissonant chord should be expected. If, however, the isotope has been mapped, but a dissonant tone is heard, it may be that the wrong isotope has been received. In this latter case, the isotope would be isolated until it could be identified and returned.

When a number of radioisotopes are being detected simultaneously, each would be represented by a distinct chord, as described. However, it is preferably to also represent the chord with a replica of a different musical instrument voice. Closely adjacent fundamental frequencies about 400 Hertz, for example, could be represented by a simulated piano voice and a simulated clarinet voice to aid in distinguishing them.

Figure 4:
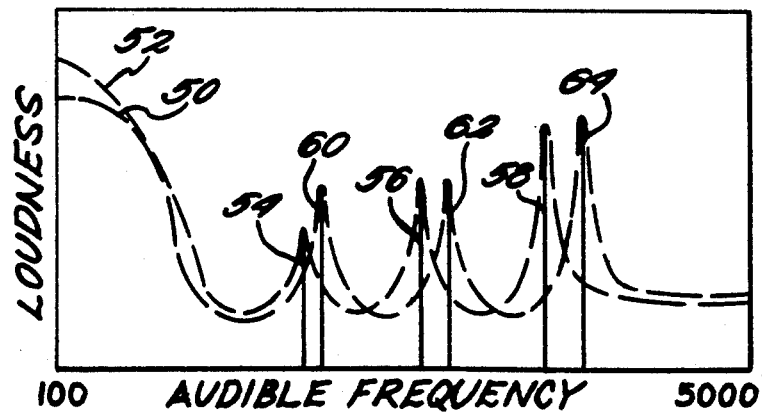
FIG. 4 shows a graph of count rate versus energy for two different radioisotopes with different chords corresponding to each.

This procedure is illustrated in FIG. 4 which shows two traces 50 and 52, each with three resonances 54, 56, and 58 and 60, 62, and 64. Because of the closeness of the resonances, using different voices would aid in distinguishing the corresponding chords.

Devices for producing frequencies and simulating musical instrument voices are well known. For example, keyboards by a variety of manufacturers (Yamaha, Casio) where a piano-type key is mapped to electronic circuit elements that produce the frequency corresponding to the key, plus overtones to replicate the sound characteristic of a piano or other musical instruments as selected by the user.

In use, the producing device would first be programmed by mapping the energy levels of resonant energies to frequencies for each isotope of interest. The chords would be constructed either by adding appropriately pleasing harmonic overtones or by using the lowest resonant energy to establish the fundamental tone and then the higher resonant energies to add higher frequencies. If the chord thus produced is not pleasing, additional overtones may be added or slight adjustments in the higher frequencies selected may be made to create a pleasing chord. For multiple frequencies, different musical instrument voices may also be selected.

Then detectors are established in appropriate locations and connected electrically to the isotopic analyzer. The output of the analyzer is connected to the producing device.

As illustrative of the present invention, but not in limitation of it, take several common radioactive isotopes: cesium 137 that emits a gamma ray with an energy of 0.662 MeV; cobalt 60 emitting a gamma rays with energies of 1.173 and 1.332 MeV; potassium 40 with a gamma ray at 1.460 MeV; and iodine 131 emitting four gamma rays at energies of 0.364, 0.284, 0.637 and 0.732 MeV. A chord may be established based on an "equally tempered" scale, with twelve equal semi-tones between octaves. The predominant gamma ray of iodine 131 is the I-131 gamma at 0.364 MeV. Thus, this gamma can be selected as the root of the tone. Then the energy of this gamma is divided into each of the energies of the other gammas in turn (e.g. $0.637/0.364 = 1.75$). Equating a doubling of frequency (which is an octave) with a doubling of gamma energy: $\log(1.75)/\log(2-^{12}) = 9.69$, which would be the number of semi-tones between the 0.364 MeV gamma and the 0.637 MeV gamma. Rounding 9.69 to 10, indicates a seventh interval in the chord above the root tone. The same process applied to the 0.732 MeV yields 12 semi-tones (rounded from 11.9), an octave; and 4.3 semi-tones below the root for the 0.284 MeV gamma of iodine 131, a sixth interval below the fundamental. Mapping Iodine 131 to a C-major chord (based at "middle C" or $C_4$) would include the notes $C_4$, $A_{b4}$, $B_{b5}$ and $C_5$.

If cobalt 60, cesium 37 and potassium 40 are in the same radiation spectrum, cesium's 0.662 MeV gamma can be selected as the root. Then applying the mathematical treatment described above, namely, a ratio of the energies of the gammas of the other isotopes to the 0.662 MeV gamma of cesium and then a division of the logs of these ratios by log $(2^{-12})$ followed by a rounding to the nearest whole semi-tone, yields notes at 10, 12 and 14 semi-tones above the root. Again using a C-major chord based on middle C, the notes are $C_4$ for Cs-137, $B_{b5}$ for Co-60 (1.173 MeV), $C_5$ for Co-60 (1.332 MeV) and $D_5$ for K-40.

Using constants to produce pleasing intervals (3rds, 5ths, . . .) and starting with cobalt 60, the ratio of the 1.332 MeV Co-60 gamma to its 1.173 gamma is 1.136. Dividing log (1.136) by log $(2^{-12})$ yields 2.2, which will be referred to a N. A major 3rd interval requires a separation of four semi-tones. A factor of 1.82 (the "q" factor) is required to raise 2.2 to 4. In a spectrum using Co-60's gammas as the basis (mapped to a major 3rd interval), other gamma energies are divided by 1.173, then the ratios of this quotient to log $(2^{-12})$ are multiplied by q (1.82) and rounded to the nearest whole number of semi-tones. Following this procedure, potassium 40, for example, would be seven semi-tones above the root as established by the 1.173 MeV gamma of cobalt 60.

Of course, an octave does not have to based on twelve "equal semi-tones" but, rather can be based on twelve equally divided frequency intervals between octaves. The mathematical treatment is otherwise the same.

It will be apparent to those skilled in the art that may changes and substitutions can be made to the preferred embodiment herein described without departing from the spirit and scope of the present invention as defined by the appended claims.

What is claimed is:

1. An apparatus, comprising:
   at least one radiation detector, each of said at least one radiation detector producing an output;
   means responsive to said at least one radiation detector for determining the resonance energy levels of any radiation detected by said at least one radiation detector; and
   means in mapped communication with said determining means for producing at least one chord in an audible range, each of said at least one chord characteristic of a radioisotope,
   said producing means producing said at least one chord when said at least one radiation detector detects a radioisotope.

2. The apparatus as recited in claim 1, wherein said producing means produces a sound in addition to said at least one chord representing an unknown radioisotope.

3. The apparatus as recited in claim 1, wherein said each at least one chord comprises:
   a set of tones, said set of tones having
   a fundamental tone and
   at least one harmonic overtone,
   said fundamental tone and said at least one harmonic overtone each having a frequency within said audible range,
   the frequency of said fundamental tone positioned within said audible range in accordance with the energy of the lowest resonance energy level detected by said at least one radiation detector.

4. The apparatus as recited in claim 1, further comprising clock means for marking an interval of time and wherein said producing means produces said at least one chord continuously so long as at least one detector detects a radioisotope during said time interval.

5. The apparatus as recited in claim 1, further comprising clock means for marking an interval of time and wherein said producing means produces said at least one chord rhythmically so long as at least one detector detects a radioisotope during said time interval.

6. The apparatus as recited in claim 1, wherein said range is 100 to 5000 Hertz.

7. The apparatus as recited in claim 1, wherein said producing means assigns a specific musical instrument voice to each radioisotope.

8. An apparatus for radiation monitoring, said apparatus comprising:
   at least one radioisotope detector, each of said at least one radiation detector producing a count for each radioisotope detected;
   an isotopic analyzer in electrical connection with said at least one radiation detector, said isotopic analyzer determining the number of counts at each energy level; and
   means in mapped communication with said isotopic analyzer for producing at least one chord in an audible range, each of said at least one chord corresponding to a radioisotope detectable by said radioisotope detector,
   said producing means producing said at least one chord when said corresponding at least one radiation detector detects a radioisotope.

9. The apparatus as recited in claim 8, wherein each radioisotope has a lowest resonance energy and each chord further comprises a fundamental frequency and at least one additional frequency within an audible range, and said isotopic analyzer determines said counts over an energy range, and wherein said fundamental frequency is selected from said audible range in proportion to said lowest resonance energy in said energy range.

10. The apparatus as recited in claim 8, wherein each radioisotope has a lowest resonance energy and at least one higher resonance energy and each chord further comprises a fundamental frequency and at least one additional frequency within an audible range, and said isotopic analyzer determines said counts over an energy range, and wherein said fundamental frequency is selected from said audible range in proportion to said lowest resonance energy in said energy range and said at least one additional frequency is selected from said audible range in proportion to said at least one higher resonance energy in said energy range.

11. The apparatus as recited in claim 8, wherein said producing means produces each of said at least one chord at a volume proportional to the number of counts detected.

12. The apparatus as recited in claim 8, further comprising clock means for marking an interval of time and wherein said producing means produces said at least one chord continuously so long as at least one detector detects a radioisotope during said time interval.

13. The apparatus as recited in claim 8, further comprising clock means for marking an interval of time and wherein said producing means produces said at least one chord rhythmically so long as at least one detector detects a radioisotope during said time interval.

* * * * *